J. S. JEWETT.

Assignor to J. E. GOLDSWORTHY.

Gate.

No. 8,232. Reissued May 14, 1878.

WITNESSES.

John W. Angell

Edward O. Stanley

INVENTOR.

Jasper S. Jewett by his atty

J. E. Goldsworthy

N. PETERS, PHOTO-LITHOGRAPHER, WASHINGTON, D. C.

UNITED STATES PATENT OFFICE.

JASPER S. JEWETT, OF SEDGWICK, KANSAS, ASSIGNOR TO JOHN E. GOLDSWORTHY, OF CENTRAL FALLS, RHODE ISLAND.

IMPROVEMENT IN GATES.

Specification forming part of Letters Patent No. 77,492, dated May 5, 1868; Reissue No. 8,232, dated May 14, 1878; application filed March 15, 1878.

*To all whom it may concern:*

Be it known that I, JASPER S. JEWETT, of Sedgwick, county of Harvey, and State of Kansas, (formerly of Ottawa, La Salle county, Illinois,) have invented new and useful Improvements in Gates; and I do hereby declare that the following, taken in connection with the drawings which accompany and form part of this specification, is a description of my invention sufficient to enable those skilled in the art to practice it.

Figure 1:
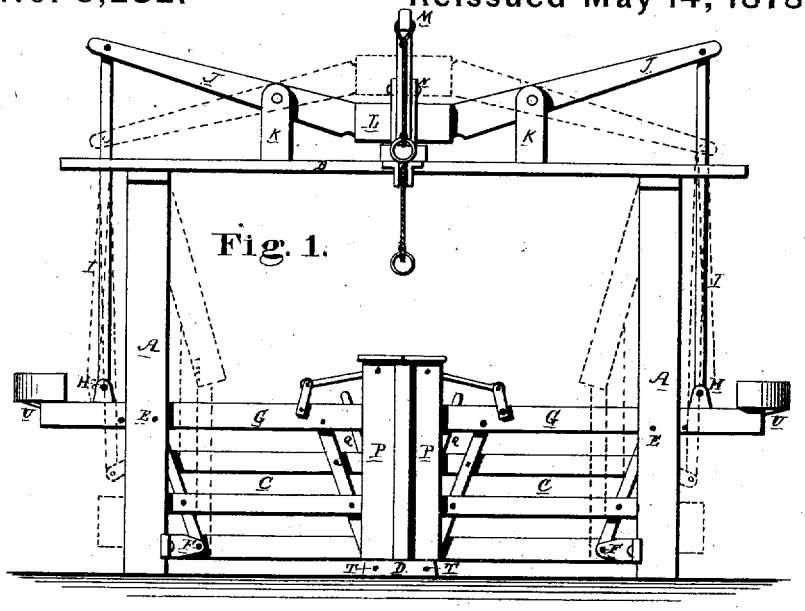
Figure 3:
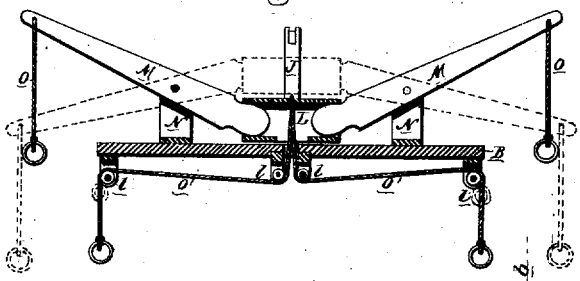
Figure 4:
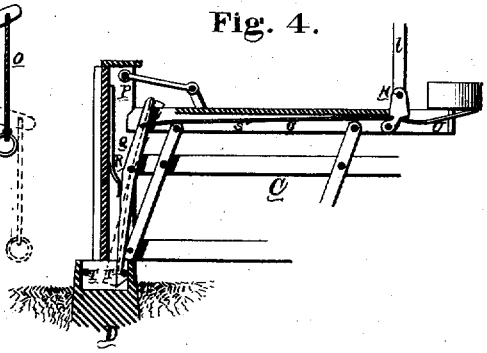
Figure 2:
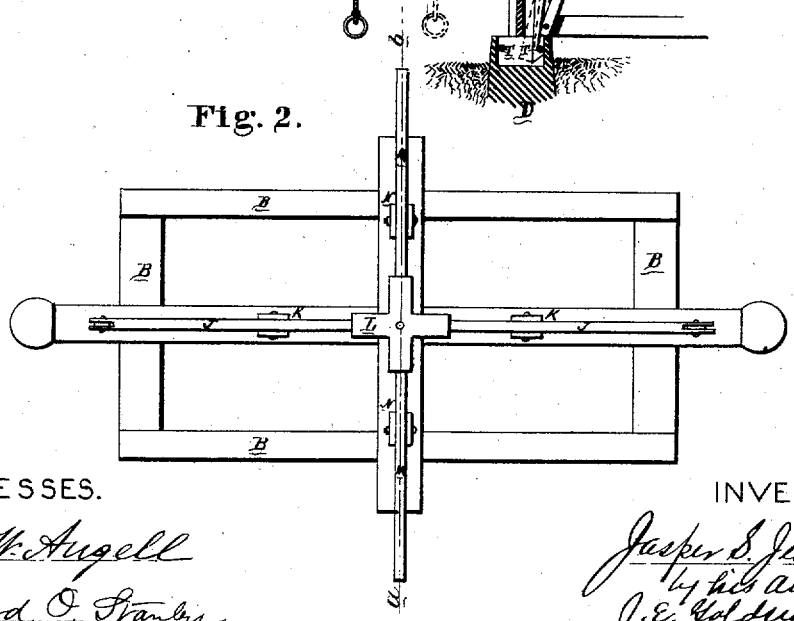

In the drawings, Figure 1 is an elevation of my gate when closed. Fig. 2 is a plan of the same. Fig. 3 is a transverse section of its operative ropes and levers, such being taken through the line *a b* of Fig. 2. Fig. 4 is a vertical section representing the mechanism by means of which the gate is locked and unlocked.

Similar letters of reference indicate corresponding parts.

The object of my invention, mainly, is to provide a gate which can be manipulated with ease and freedom by a person seated in a vehicle or riding on horseback without alighting.

The invention consists, mainly, of counterbalanced gates or gate-rails provided with pivots for fulcra, on which they swing vertically, and connected by actuating mechanism, by means of which the gates may be opened or closed simultaneously, as hereinafter described.

In the drawings, A A represent two posts or standards, connected at the top by a framework made of the timbers B B B. The top rails or bars G G of the gates are hollow to admit ropes or chains, for purposes hereinafter to be described. Slats C C C are paneled to and below said top rails. These slats are connected by cross-bars P P, which are pivoted to them and to the top rails G G.

At E E the top rails G G are pivoted to the posts or standards A A, so that they may be swung or moved vertically on the pivots shown at E E. The distance from the outer end of each rail to the point of suspension or pivot E is a little less than the distance from said pivot E to the ground, so that the rails G G will swing clear of the ground at their outer ends when assuming a vertical position. The top rail or bar of each gate projects beyond the standard or point of support, and is provided with weights, or so constructed as to practically counterbalance the inner portion, whatever be its length or weight. The gates are likewise pivoted to the posts or standards at F F.

D is a block, which may be used as a support for the gates at the point where they meet, and to which they may be locked. H H are tumblers, to which are attached or jointed the rods I I, which are also jointed to the levers J J above. These levers have fulcra K K, and their inner ends are inserted into a hollow cross, L, in which two other levers, M M, are inserted at right angles with the levers J J, which have fulcra N N. The levers J J have attached to their outer ends ropes O O, terminating in rings which are suspended, one on each side of the gate. The purpose of the hollow cross L is that all the said levers may be actuated from a common point with results as hereinbefore explained.

In opening the gate the hollow cross L will be raised, and in closing the gate the said cross will be forced downward.

It will be seen that by pulling on either of the ropes O O motion will be communicated through the rods I I to the gates, causing both to open at the same time and to fold into positions on opposite sides of the roadway, as shown in dotted lines in Fig. 1. Two ropes or chains, O′ O′, pass through the cross L, and over and around the pulleys *l l l l*, and terminate in rings also. These ropes or chains are used to close the gate. By pulling either of these ropes when the gates are open the cross L will be pulled downward, and will carry with it the levers J J and rods I I, thus causing the gates to swing down and close.

Each gate extends over the roadway and meets the other gate at or near the middle thereof when closed.

In Fig. 4 is shown the mechanism by which the gates are locked when let down.

The cross-bars P P are made hollow, and contain the catches Q Q and springs R R. Ropes or chains S pass from the catches Q Q to the tumblers H H. In the same figure is likewise shown, by dotted lines, the position of the latching parts when the gate is unlocked. When the rods I I are pressed downward, in manner hereinbefore described, the tumblers H H are thrown backward, pulling the ropes or chains S, and thus causing the catches Q Q, to which the ropes are attached, to release their hold on the bolts T T in the block D. The springs N N are adapted to throw the tumblers H H into their normal positions after the gates are let down and locked.

I claim as new and desire to secure by Letters Patent—

1. A vertically-swinging gate of two parts, each part having an extended top rail or bar, which is weighted on the outer end, in combination with posts or standards arranged on opposite sides of the gate-opening, to which the said parts are secured on the respective sides of the gate-opening by journals or shafts, and counterbalanced on the said journals or shafts by means of weights attached to the outer part of the extended top rail or bar, substantially as specified.

2. In combination, substantially as specified, with posts or standards arranged on opposite sides of the gate-opening, two counterbalanced vertically-folding gates, each provided with a projecting top rail secured to the said standards by means of journals or shafts, on which they swing from each other to a vertical position in opening, and toward each other to a horizontal position over the roadway in closing, the said gates being counterpoised on the journals or shafts by means of weights attached to the projecting top rail thereof.

3. In combination, substantially as specified, with two counterbalanced vertically-swinging gates, journaled to posts or standards arranged on opposite sides of the gate-opening, each gate being weighted on the outer end of the projecting top rail thereof to counterpoise the weight between the standards, interconnecting mechanism, substantially as described, for simultaneously opening or closing them (the said gates.)

4. In combination, substantially as specified, with the counterbalanced vertically-swinging gates or gate-rails, having pivots or bolts, on which they swing, and provided with mechanism, essentially as described, for simultaneously raising or lowering them, (the said gates,) locking mechanism, substantially as specified, consisting of the tumbler H, chain or rope S, lever-latch Q, springs U R, and bolt T, applied to each gate, the sill D, and rod I, as described.

JASPER S. JEWETT.

Witnesses:

W. M. CONGDON,

T. R. HAZARD.